United States Patent
Kasai et al.

(10) Patent No.: US 6,601,627 B2
(45) Date of Patent: Aug. 5, 2003

(54) CONTINUOUS FORMING DEVICE OF FIBER REINFORCED PLASTIC SQUARE PIPE

(75) Inventors: Toru Kasai, Tokyo (JP); Akiyoshi Sugawara, Tokyo (JP); Makoto Okamoto, Tokyo (JP)

(73) Assignee: Jamco Corporation, Tokyo (JP)

( * ) Notice: Subject to any disclaimer, the term of this patent is extended or adjusted under 35 U.S.C. 154(b) by 120 days.

(21) Appl. No.: 09/861,626

(22) Filed: May 22, 2001

(65) Prior Publication Data
US 2002/0000295 A1 Jan. 3, 2002

(30) Foreign Application Priority Data
May 23, 2000 (JP) .................................. 2000-150904

(51) Int. Cl.[7] .............................................. B29C 70/52
(52) U.S. Cl. ...................... 156/441; 156/156; 156/180; 156/433
(58) Field of Search ................................ 156/173, 175, 156/180, 181, 166, 441, 433, 499, 156, 459, 425

(56) References Cited

U.S. PATENT DOCUMENTS 3,284,849 A   11/1966  Coleman et al.
3,769,127 A  * 10/1973  Goldsworthy et al. ...... 156/175
4,891,179 A  *  1/1990  Peacock et al. ............. 264/565

FOREIGN PATENT DOCUMENTS

| GB | 1035051 | 7/1966 |
|---|---|---|
| JP | 01208123 | 8/1989 |
| JP | 04151232 | 5/1992 |
| JP | 04341833 | 11/1992 |

OTHER PUBLICATIONS

European Search Report dated Sep. 11, 2002.

* cited by examiner

Primary Examiner—Jeff H. Aftergut
(74) Attorney, Agent, or Firm—Armstrong, Westerman & Hattori, LLP (57) ABSTRACT

A device 1 for continuously manufacturing an FRP square pipe includes a core 10 having a long length for laminating prepreg sheets thereto, and prepreg sheets are supplied from prepreg-sheet laminating devices 20, 30, 40, and 50 to said core 10 covered with a release film, said laminated sheets laminated into the shape of a square pipe. Said core 10 has an outer diameter size smaller than the inner diameter size of the square pipe to be manufactured. A pre-expansion device 80 expands said laminated prepreg sheets to the shape of a square pipe having a predetermined inner diameter size, and a hot press device 100 heats and pressurizes the pipe. The pipe is then additionally heated in a postcure furnace 110 to complete the forming process. A pulling device 130 arranged downstream of a cramp device 120 pulls out said square pipe intermittently. A cutter not shown cuts said square pipe to produce the desired product.

5 Claims, 7 Drawing Sheets

CONTINUOUS FORMING DEVICE OF FIBER REINFORCED PLASTIC SQUARE PIPE

FIELD OF THE INVENTION

The present invention relates to a device for continuously forming a square pipe made of a light-weight, high-strength FRP (fiber reinforced plastic) utilized in an aircraft, or a square pipe made of FRP utilized as an architectural material.

DESCRIPTION OF THE RELATED ART

A conventionally known method for forming an FRP square pipe is called a pultrusion (protrusion) method, where fiber is first impregnated with resin before being guided into a heated mold thereby curing the resin. However, this conventional method restricts the ratio of fiber content in the material, and the fiber orientation in the material is easily disordered, so it is difficult to produce a formed product having high quality. On the other hand, a product formed of a prepreg material (fiber impregnated with resin and then semi-cured) can have higher ratio of fiber content and the fiber orientation can be uniform, so such product is used to manufacture high-strength parts used in an aircraft and the like.

A conventional method for forming an FRP square pipe using a prepreg material involves providing a mold-release treatment to a metallic square column to be used as a core, laminating a predetermined number of layers of prepreg sheets to the core, and forming the desired shape by an autoclave. However, when the length of the desired product is long, the autoclave and the device for drawing out the metallic square column after curing the material must also be large, so a larger facility is required.

Another method for forming the FRP square pipe involves using a silicon rubber tube and the like as core, and after laminating the prepreg material to the tube, the laminated material is placed inside an external mold, and inner air pressure is provided to the material to form the desired shape. Only small pulling force is required according to the second method, but an external mold must be prepared, and the method involves another problem related to the durability of the silicon rubber tube.

SUMMARY OF THE INVENTION

The present invention provides a device capable of continuously forming a high-quality square pipe using prepreg material, that can be used in an aircraft and the like, and that requires a smaller number of extrinsic equipment.

The device for continuously forming an FRP square pipe according to the present invention comprises a device for sequentially laminating a release film and a prepreg material sheet cut to have predetermined widths onto a square pipe made of aluminum having an outer diameter that is smaller than the inner diameter of the square pipe to be formed, a pre-expansion device placed before a mold for expanding the laminated prepreg material in the radial direction so that its inner diameter matches the inner diameter of the product, and a hot press that is opened and closed corresponding to the movement of a pulling device. The pulling device moves the formed product for a predetermined length when the hot press is opened. The aluminum square pipe functioning as the core is pulled toward the pulling device from the hot press, and is supported by a device capable of taking out the center piece even during the forming process.

BRIEF DESCRIPTION OF THE DRAWINGS

FIGS. (3a) and 3(b) are an explanatory view showing the core of the laminating device of prepreg sheets.

DETAILED DESCRIPTION OF PREFERRED EMBODIMENTS

Figure 1:
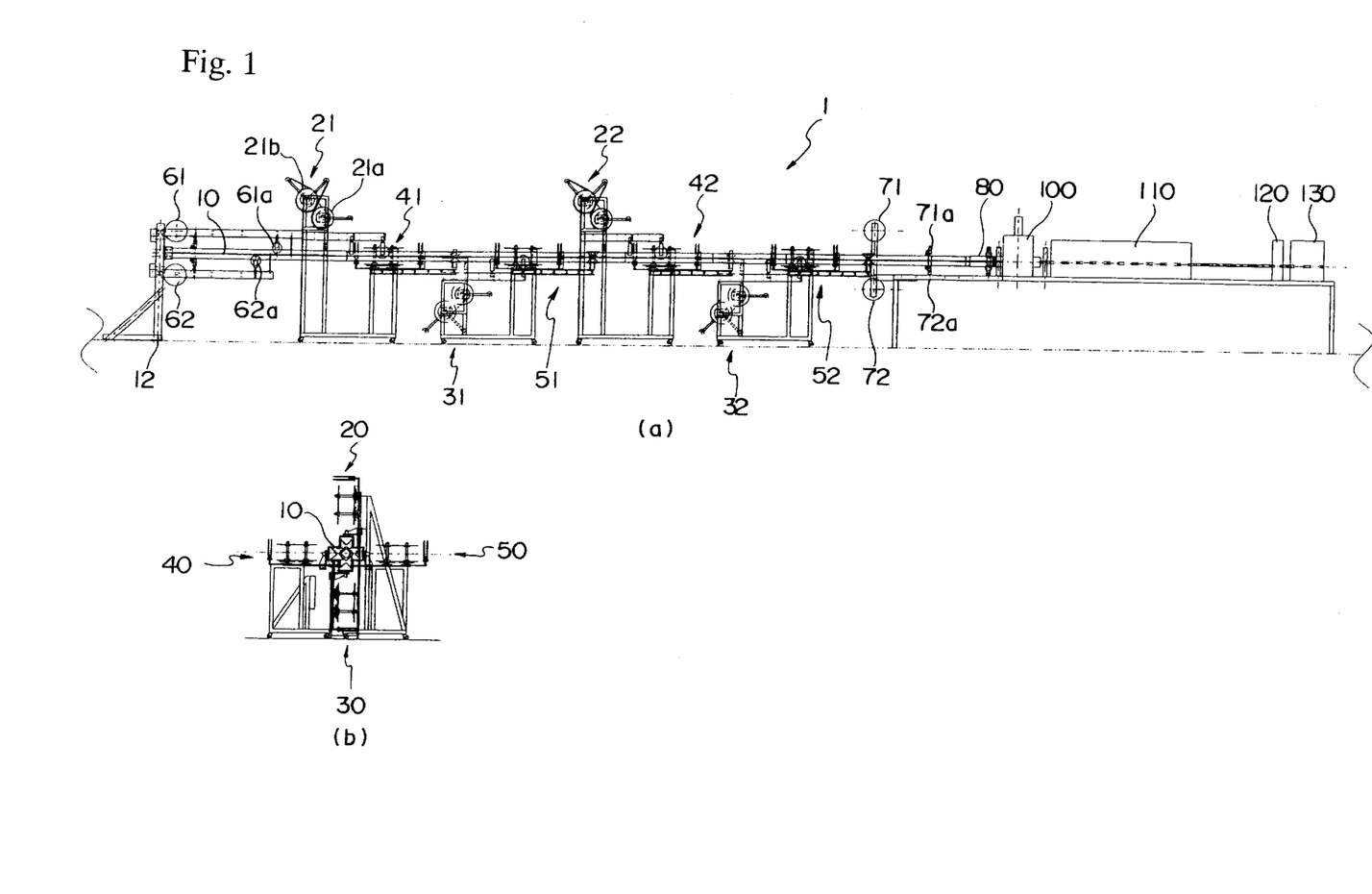
FIGS. 1(a) and 1(b) are an explanatory view showing the structure of the continuous forming device of an FRP square pipe according to the present invention.

FIG. 1 is an explanatory view showing the structure of a continuous forming device of FRP square pipe according to the present invention.

The continuous forming device of an FRP square pipe shown as a whole by reference 1 is equipped with a long core member 10 having an external diameter smaller than the inner diameter of the square pipe to be manufactured. The core 10 is for laminating a required amount of prepreg sheets to the outside thereof, and the length of the core is set so that the prepreg sheets can be laminated thereto.

Actually, the length of the core must be as long as approximately 10 m, so the core is made of a lightweight metal such as aluminum, and the ends thereof are supported by stands.

Lamination devices 20, 30, 40, and 50 are arranged at 90-degree-intervals around the core 10.

Figure 2:
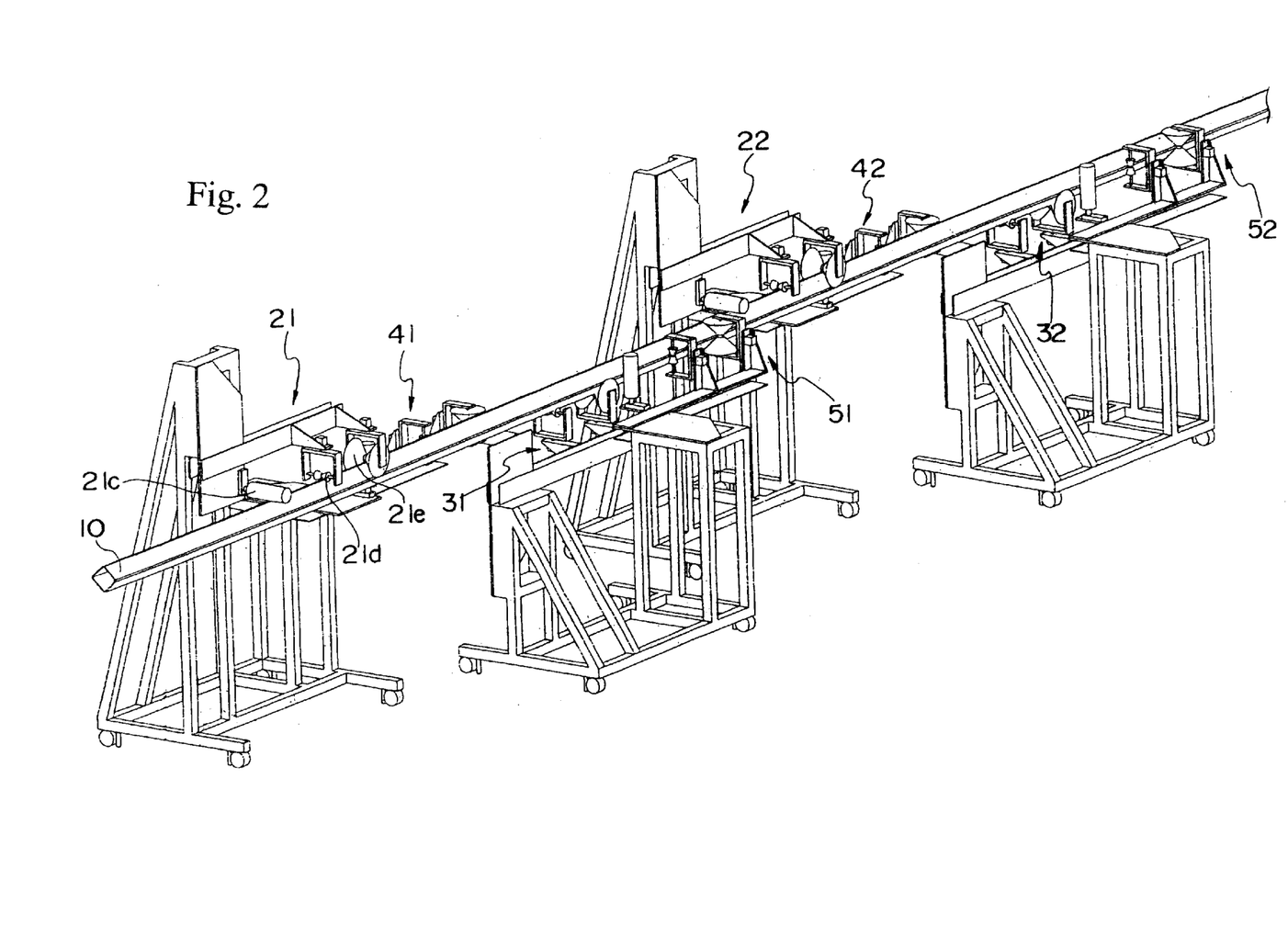
FIG. 2 is a perspective view of the laminating device of prepreg sheets.
Figure 3:
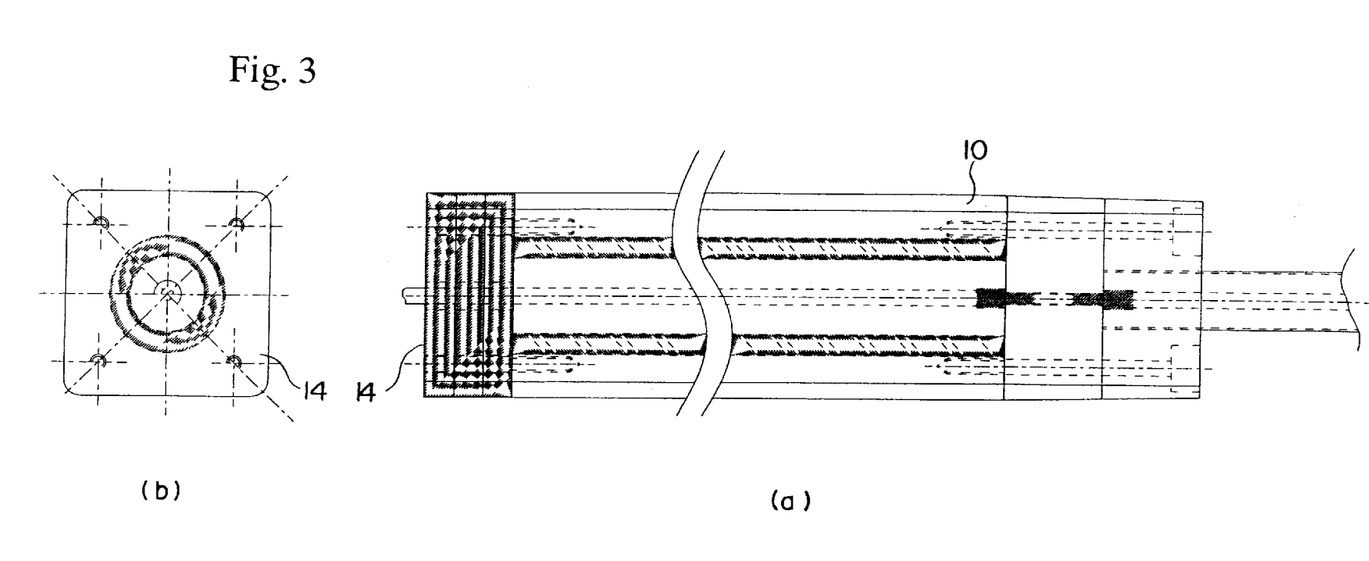

FIG. 2 is a perspective view showing the structure of the device for laminating prepreg sheets, and FIG. 3 is an explanatory view of the core.

The prepreg-sheet laminating devices 20 and 30 are respectively arranged above and under the core 10 that is positioned with its two opposing corners arranged in the vertical direction. The prepreg-sheet laminating devices 40 and 50 are arranged horizontally with the core 10 positioned at the center between the two devices.

The prepreg-sheet laminating device 20 arranged above the core 10 includes plural stations 21 and 22.

Each station has the same structure. The first station 21 is equipped with two supply reels 21a for supplying the prepreg sheets. Each supply reel includes a film-takeup roll, which spools the removed film adhered to the surface of the tacky prepreg sheet. The supplied prepreg sheet has a width size corresponding to two of the four sides of the square column-shaped core.

The supplied prepreg sheet is guided by a cylindrical first roll 21c so that the center of the sheet is positioned on one corner of the core 10, and the center portion is pushed onto the corner of the core by a second roll 21d. A third roll 21e laminates the whole prepreg sheet on the surface of the core 10.

Preceding the lamination of the prepreg sheet to the surface of the core 10, a film called a release film is supplied to the surface of the core 10 that is used for removing the manufactured FRP square pipe from the core 10. The release film drawn out from supply reels 61 and 62 mounted to the stand 12 of the core 10 is laminated to the surface of the core 10 by guide rolls 61a and 62a.

According to the embodiment shown in FIG. 1, two sets of prepreg-sheet laminating devices 21 and 22 are arranged above the core 10, and two sets of prepreg-sheet laminating devices 31 and 32 are arranged below the core 10.

Similarly, two sets of prepreg-sheet laminating devices 41, 42 and 51, 52 are arranged on the left and right sides of the core 10.

As explained, the cross-sectional structure of the FRP square pipe comprises eight layers of prepreg sheets laminated on each side.

A release film is applied to the outside of the prepreg sheets laminated into a square pipe form by the prepreg sheet laminating device. The release film taken out from supply reels 71 and 72 are superposed to the surface of the prepreg sheets by guide rolls 71a and 72a.

The prepreg sheets laminated into the shape of a square pipe is sent to a hot press device 100. Prior to this hot press treatment, the laminated sheets are conveyed through a pre-expansion device 80.

Figure 4:
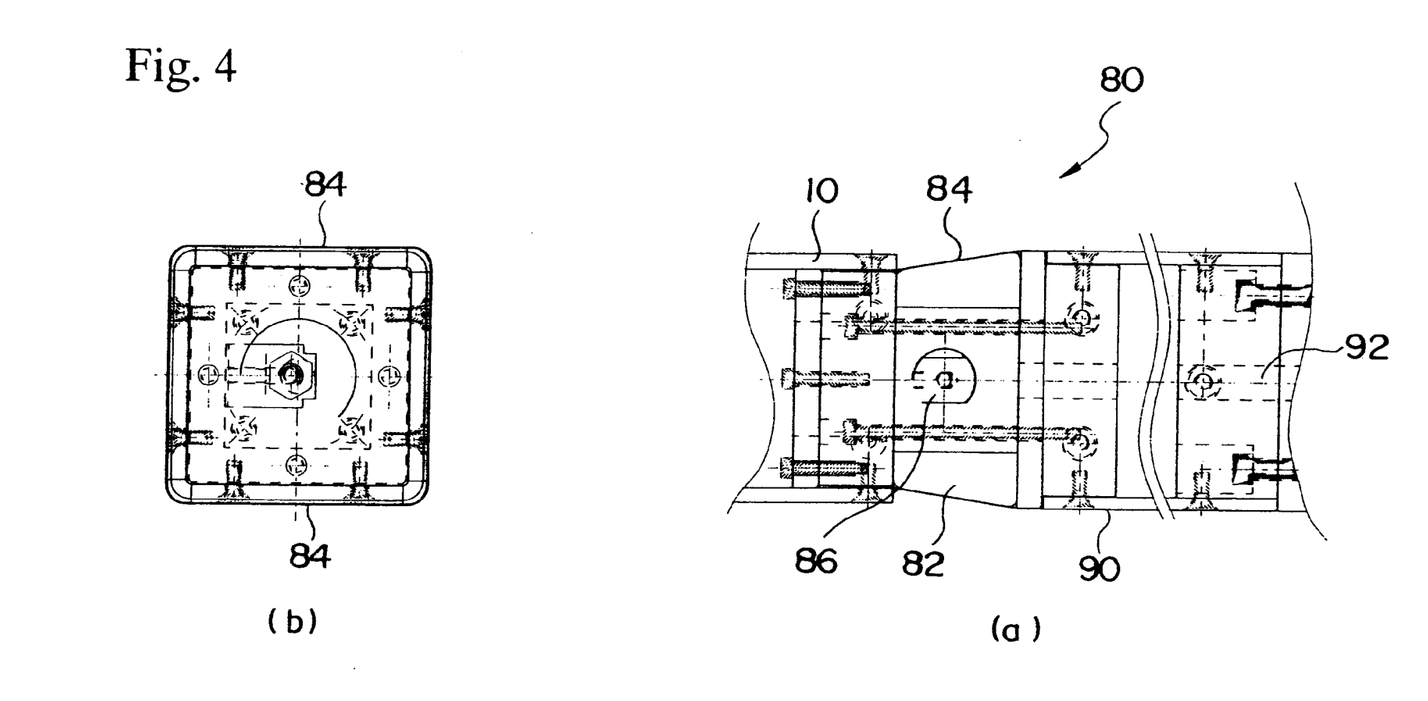
FIGS. 4(a) and 4(b) are an explanatory view showing the pre-expansion device.

FIG. 4 is an explanatory view showing the structure of the pre-expansion device 80.

The pre-expansion device 80 connected to the end portion of the core 10 comprises an airbag 82 and a stainless steel belt 84 formed to the exterior of the airbag 82, which is connected to a hot-press core 90. The hot-press core 90 has a slightly larger diameter than the core 10 used for laminating the prepreg sheets, and the diameter of the core 90 corresponds to the inner-diameter size of the square pipe to be manufactured.

The prepreg sheets laminated into the shape of a square pipe on the prepreg-sheet laminating core 10 are not yet sufficiently pressed together, and air bubbles may exist between the laminated sheets.

The pre-expansion device 80 provides expansion force or tension from the inside of the laminated body of prepreg sheets, and completes the lamination of the sheets.

The steel belt 84 is mounted in a tapered state having widening ends, and the inner airbag 82 is capable of expanding and contracting.

The work piece (square pipe) formed of prepreg sheets is pulled into the hot-press device in a stepwise fashion by a pulling device explained later.

Corresponding to the stepwise movement of the work piece, air is supplied to the airbag 82 through an air passage 92.

The airbag 82 provided with air presses the square pipe outward from the inside thereof through the steel belt 84.

This pressing force expands the inner diameter of the square pipe forcibly. This pre-expansion process provides more strength to the laminated body of prepreg sheets, which is then sent to the hot-press core 90.

Figure 5:
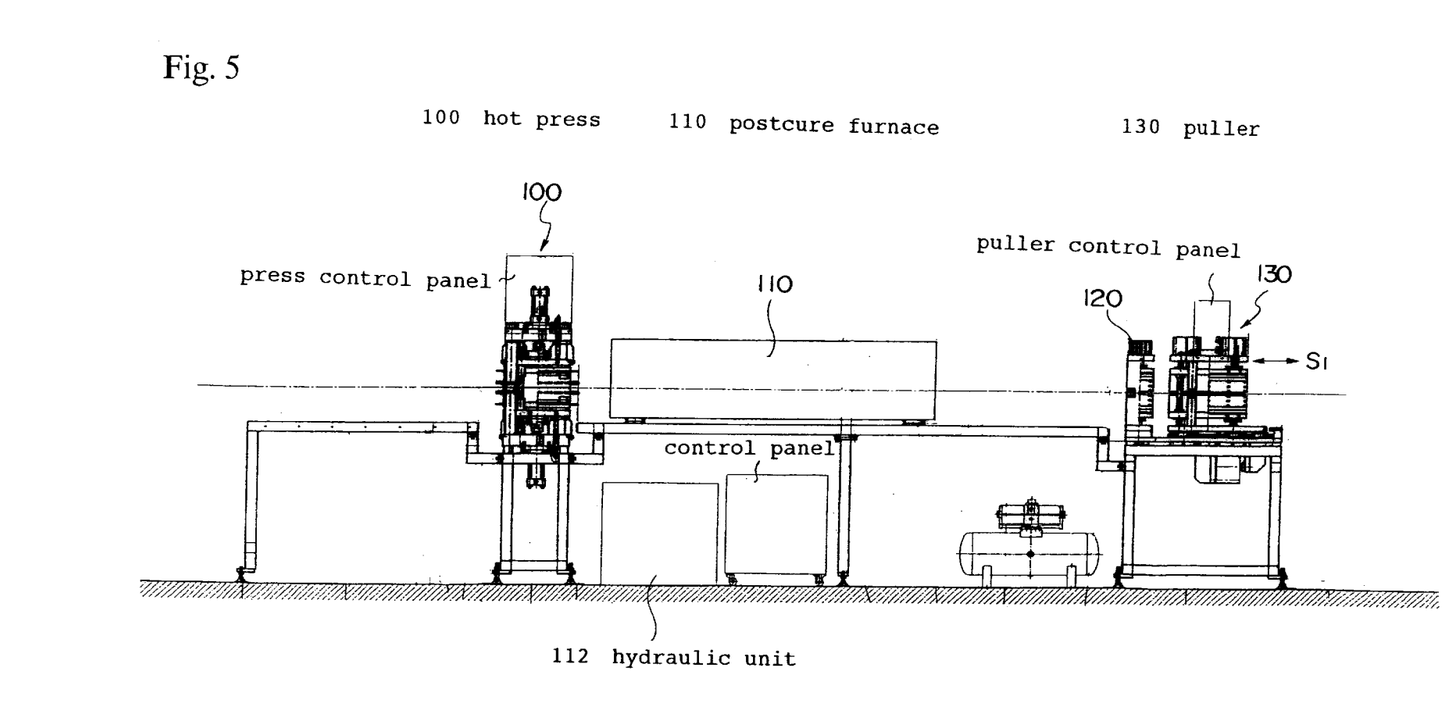
FIG. 5 is an explanatory view showing the layout of the hot press device, the postcure furnace, the cramp device, and the pulling device.

FIG. 5 is an explanatory view showing the layout of a hot press 100, a postcure furnace 110 which is an additional heating furnace, a work clamp device 120, and a pulling device (puller) 130 for pulling the product.

The hot press device 100 heats and pressurizes the prepreg sheet material laminated in the form of a square pipe for a predetermined time from the outside using a heated mold, thereby promoting the curing of thermosetting resin impregnated to the sheet material.

The hot-press core 90 penetrates the mold of the hot press device 100 and protrudes from the outer end.

The heating temperature and the heating time are selected appropriately according to the property of the prepreg sheet material.

The hot-pressed and formed square pipe product is then transmitted to the postcure furnace 110. The postcure furnace 110 heats the square pipe passing therethrough at a predetermined temperature for a predetermined time, thereby completing the cure of the thermosetting resin in the prepreg sheet.

The clamp device 130 provided at the exit end of the postcure furnace 110 grips and fixes the continuously conveyed square pipe body. The prepreg sheet material supplied to the prepreg-sheet laminating core is provided with tension that pulls the material toward the supply reel. Therefore, the laminated prepreg sheet material is constantly pulled back toward the supply reel. The clamp device holds the square pipe product against this returning force.

The pulling device 130 is equipped with a means for gripping the square pipe product and moving back-and-forth along the direction of the arrow. A hydraulic power source is used to provide the back-and-forth movement.

Figure 6:
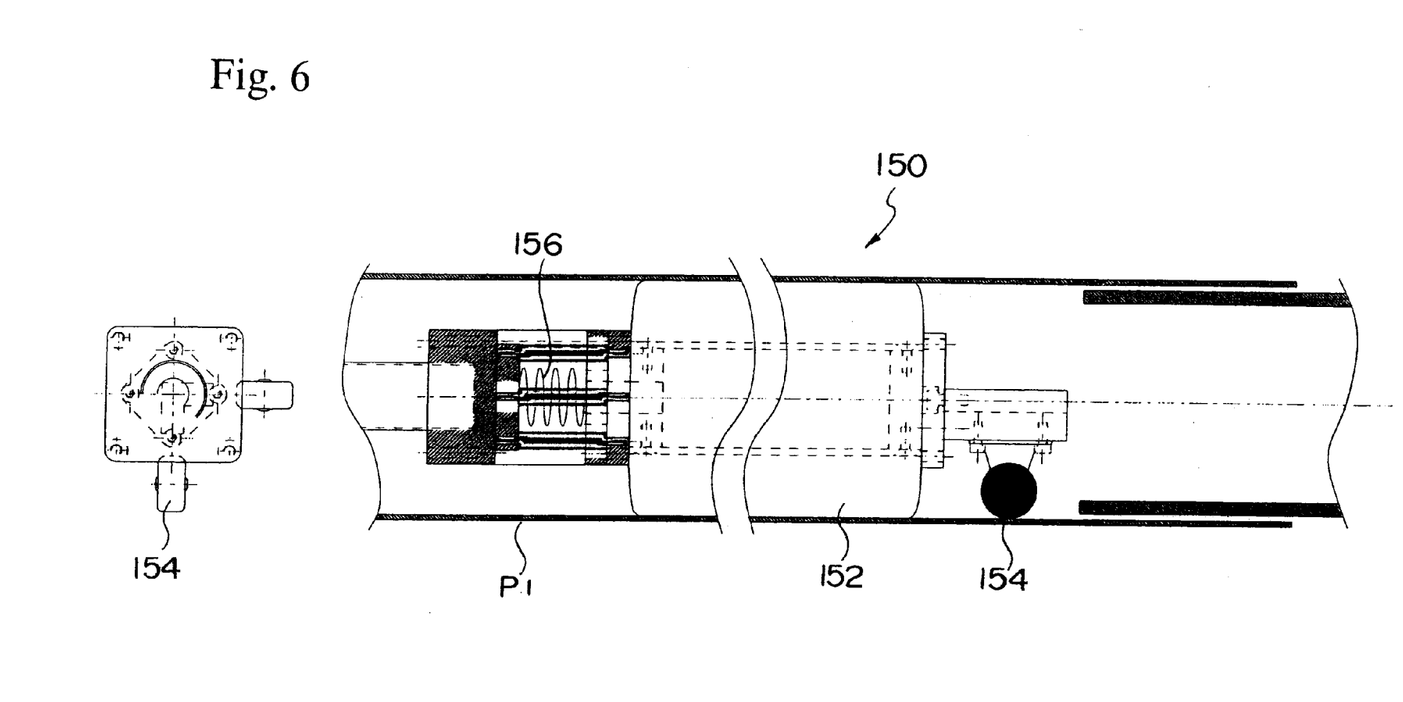
FIG. 6 is an explanatory view showing the core of the pulling device.

FIG. 6 shows the structure of a puller core equipped to the pulling device.

The pulling device 130 includes a gripper not shown that grips the manufactured FRP square pipe $P_1$ from the outside. In order to prevent the FRP square pipe $P_1$ from collapsing by the gripping force, a puller core 150 is used.

The puller core 150 comprises a core member 152 that expands or contracts by air, and the core member 152 is capable of moving together with the product by a roller 154.

The core member 152 is returned to the original position by a spring 156.

When the pulling device 130 grips the FRP square pipe $P_1$ with the gripper and pulls the pipe to the axial direction, the core member 152 of the puller core 150 moves together with the pulling device 130.

When the pulling process is completed and the pulling device 130 is returned, the core member 152 is also returned to its original position by the spring 156.

Figure 7:
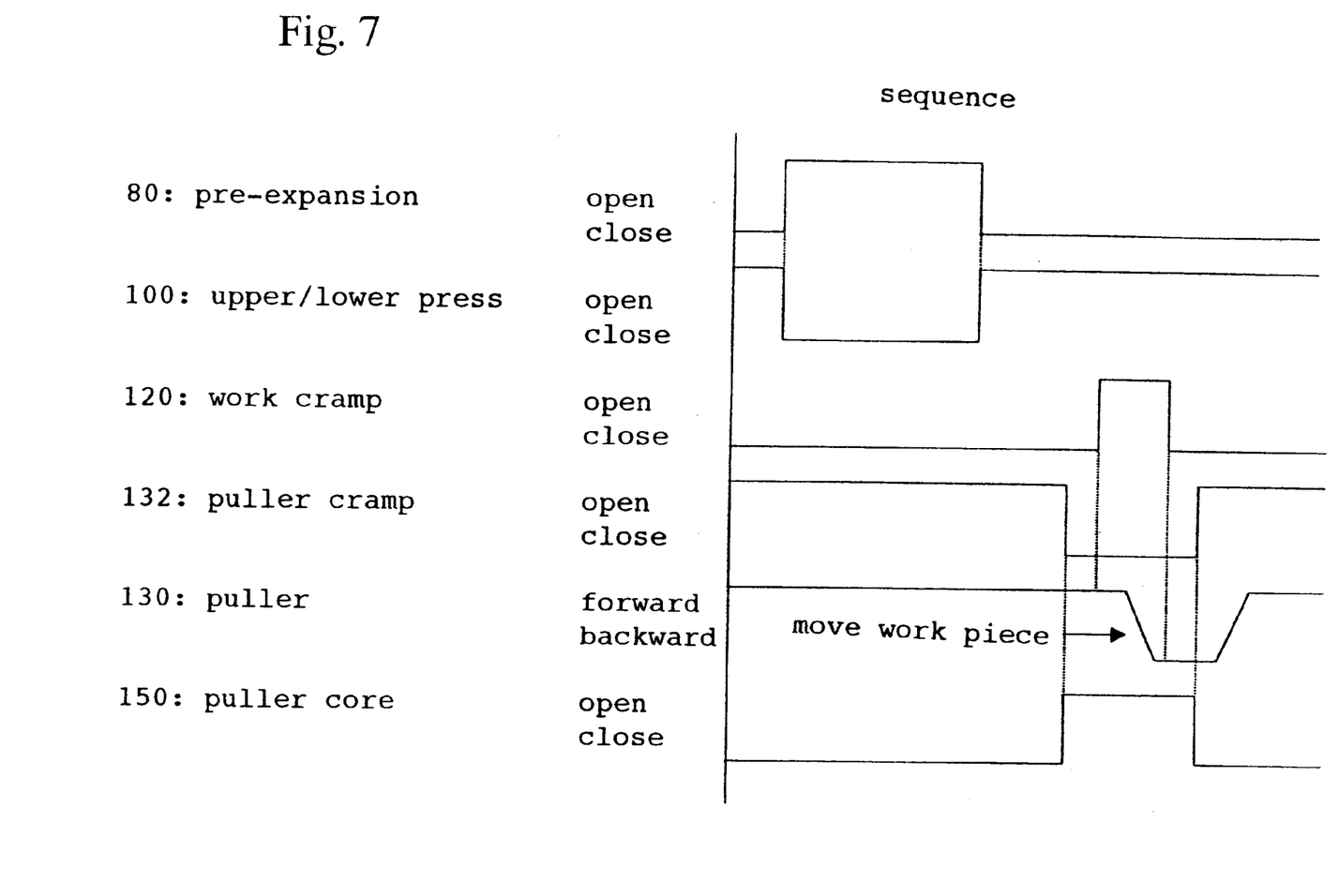
FIG. 7 is a chart showing the timing of operation of the devices.

FIG. 7 is a sequence chart showing the timing of operation of the present invention.

While the mold of the hot press device is closed, and heat and pressure is provided to the prepreg sheet material, the pre-expansion device 80 expands the prepreg sheet material to a predetermined square pipe diameter.

During the hot press process, the work clamp device 120 grips the work piece. During this time, the clamp of the pulling device is opened.

When one step of the hot press process is completed, the mold of the hot press is opened, the work clamp is released, and the pulling device is operated to pull the work piece out for a predetermined length. The puller core follows this movement.

The above-mentioned steps are repeated to manufacture the FRP square pipe continuously.

The continuously formed FRP square pipe is cut into predetermined lengths by a cutter not shown, thereby providing the desired product.

The present invention provides a device for manufacturing an FRP square pipe continuously, that involves laminating prepreg sheets in the form of a square pipe, and providing treatments such as hot press and postcure to the pipe.

According to the invention, the laminating process of the prepreg sheets is automated, and a high-quality FRP square pipe is manufactured efficiently.

We claim:

1. A device for continuously forming a fiber reinforced plastic square pipe using a semi-cured preimpregnated material prepared by impregnating thermosetting resin to carbon fiber or glass fiber; said device comprising a first device for sequentially laminating a number of sheets of said preimpregnated material on a surface of a square-column-shaped core covered with a release film, said core having an outer diameter that is smaller than an inner diameter of the square pipe to be formed;

a second device for pulling and fixing said laminated sheets throughout the forming process;

a third device for applying a release film to the outermost layer of said laminated sheets;

a fourth device for expanding said laminated sheets covered in said release film in a radial direction so that the inner diameter of said sheets corresponds to an inner diameter of said square pipe to be formed;

a fifth device comprising a hot press for applying heat and pressure to said sheets; and a sixth device comprising a heating furnace for additionally heating said hot-pressed sheets.

2. A device for continuously forming a fiber reinforced plastic square pipe according to claim 1, wherein each of said sheets of said preimpregnated material being laminated on said square-column-shaped core has a width that covers two adjacent outer surfaces of said square column.

3. A device for continuously forming a fiber reinforced plastic square pipe according to claim 1, wherein said device for laminating said sheets on the surface of said square-column-shaped core are positioned outside each corner of said core, and each device is equipped with a supply reel for supplying said sheets and a roller for bending and laminating said sheets onto the surface of said core.

4. A device for continuously forming a fiber reinforced plastic square pipe according to claim 1, wherein said device for pulling and fixing said square pipe formed of said sheets is equipped with a square-column-shaped rubber tube to be positioned inside the formed pipe for preventing said pipe from collapsing, and said tube is capable of expanding and contracting corresponding to a gripping timing of said formed pipe.

5. A device for continuously forming a fiber reinforced plastic square pipe according to claim 4, wherein said device for radially expanding the inner diameter of said square pipe to be formed, said hot press device, said pulling and fixing device, and the expanding and contracting of said tube included in said pulling and fixing device are all controlled to correspond to each other.

* * * * *